No. 839,907. PATENTED JAN. 1, 1907.
E. ULBRICH.
COUPLING FOR RAILWAY VEHICLES.
APPLICATION FILED AUG. 13, 1906.
2 SHEETS—SHEET 1.
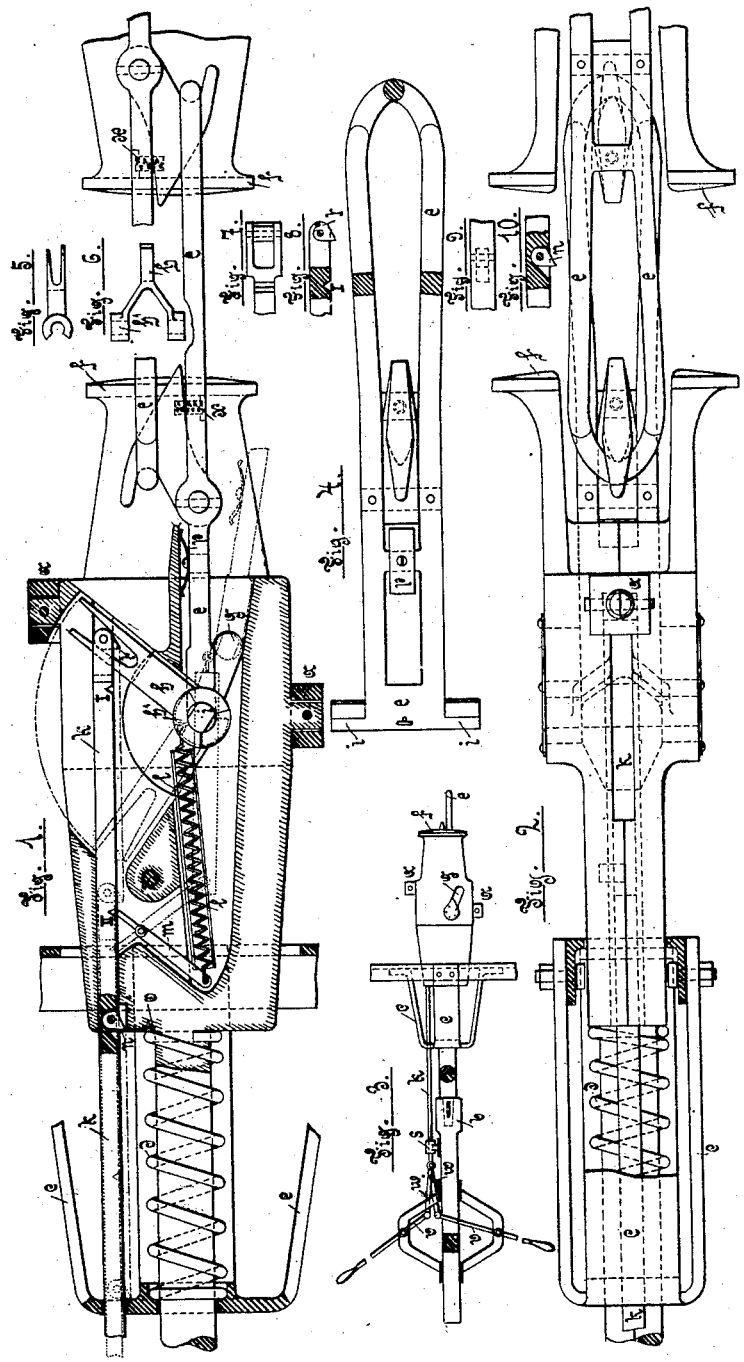
Witnesses:
Alfred Bosshardt.
Stanley E. Bramall.
Inventor
Ernst Ulbrich
Per F. Eckhardt.
Attorney.

No. 839,907. PATENTED JAN. 1, 1907.
E. ULBRICH.
COUPLING FOR RAILWAY VEHICLES.
APPLICATION FILED AUG. 13, 1906.
2 SHEETS—SHEET 2.
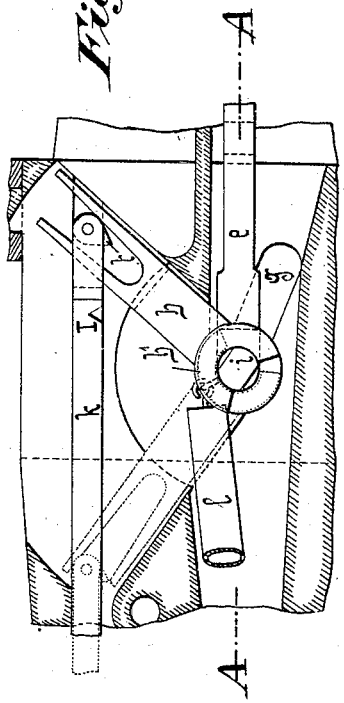
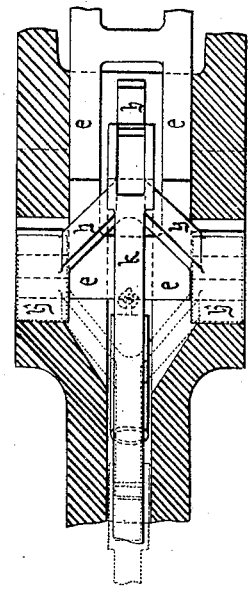
Witnesses:
Alfred Bosshardt.
Stanley E. Brawall.
Inventor.
Ernst Ulbrich
Per F. Osshardt.
Attorney.

UNITED STATES PATENT OFFICE.

ERNST ULBRICH, OF MUNICH, GERMANY.

COUPLING FOR RAILWAY-VEHICLES.

No. 839,907.   Specification of Letters Patent.   Patented Jan. 1, 1907.

Application filed August 13, 1906. Serial No. 330,291.

*To all whom it may concern:*

Be it known that I, ERNST ULBRICH, a subject of the German Emperor, residing at Munich, Germany, have invented certain new and useful Improvements in Couplings for Railway-Vehicles, of which the following is a specification.

This invention relates to improvements in that type of couplings for railway-vehicles which are tensioned and untensioned by the displacement of the coupling member in a direction inclined to the longitudinal axis of the coupling. When untensioning, the coupling is at the same time released, which release may take place while the train is in full motion.

The object of my invention is the mounting of the said coupling member in connection with a device for displacing it. I attain this object by the mechanism illustrated in the accompanying two sheets of drawings, in which—

Figure 1 is a plan of the lower half of the coupling, top half removed. Fig. 2 is a side view of Fig. 1, and Fig. 3 a general view of the coupling. Figs. 4–10 are views of details. Figs. 11 and 12 are respectively a sectional plan and a sectional side view, the latter on line A A of Fig. 11, on an enlarged scale, of the middle portion of the coupling.

Similar letters refer to similar parts throughout the several views.

In carrying out my invention I divide the coupling-casing horizontally into two symmetrical halves to facilitate the fitting together of the movable parts. In front the said halves are rigidly secured together by two screw-threaded lugs $a$ and nuts and at the rear by a socket $b$ and a cotter, Fig. 3. To the buffer-beam a bracket $c$ is secured, in which a spring $d$ is located to take up the impact which is transmitted to the coupling-casing by the buffer $f$, employed on the face of it. From the coupling-casing the impact is transmitted to the spring $d$ and by the bracket $c$ to the buffer-beam.

The coupling members $e$, consisting each of a hook and loop, are so arranged as to be capable of horizontal and vertical movement. The hooks of the coupling members $e$ are also furnished with springs $x$, Fig. 1, by means of which they are retained coupled. The coupling member $e$ is releasably mounted on the casing, so that it can be displaced therein. The shank of the coupling member $e$ has for this purpose lateral pivots $i$, Fig. 4, engaging in bearings $h'$, Figs. 5 and 6, consisting each of a bush cut open to permit of placing the said pivots into and taking them out of the same. The said bushes are mounted in bearings in the wall of the said casing and are connected together by a fork-like arm $h$, which operates in connection with a rod $k$, displaceable in the coupling-casing. The head of this rod is forked and carries inside a pawl $t$, Figs. 1, 7, and 8. To the shank of the coupling member $e$ is secured one end of a spiral spring $l$, located in a tube, the other end being secured to a lever $m$, mounted in the coupling-casing. This lever is adapted to engage in recesses I and II, formed in the rod $k$, and thereby move the same to tension or compress the spring $l$.

To retain the rod $k$ in its front position, it is furnished with a pawl $n$, Figs. 1, 9, and 10, retained by a spring $o$, secured to the coupling-casing and adapted to yield when disengaging the rod $k$. The pawl $n$ prevents the rod $k$ moving farther back than to the bracket $c$, Fig. 1. The rod $k$ has a frame to which are fulcrumed two hand-levers $v$, connected by rods $w$ to the rod $k$ to permit of moving the latter from the sides of the vehicle.

Fig. 1 shows the coupling when coupled. The rod $k$ is in its front position, also the arm $h$ of the bearings $h'$. The lever $m$ is in engagement with the recess II in the rod $k$ and the spring $l$ tensioned. The rod $k$ is retained in this position by the pressure of the flat spring $o$ upon the pawl $n$. If the coupling is to be released, (see dotted lines, Fig. 1,) the rod $k$ is pulled back by means of the hand-lever $v$, and thereby the spring $o$ caused to yield and allow the pawl $n$ to disengage. The recess II in the rod $k$ then brings the lever $m$ into the position shown in dotted lines, the spring $l$ being thereby compressed. When moving back the rod $k$, (see more particularly Figs. 11 and 12,) the bearings $h'$ turn also until the openings therein coincide with a slot $g$, provided in the coupling-casing for the pivots $i$ $i$ on the shaft of the coupling member $e$. The compressed spring $l$ then moves the liberated pivots forward in the slot $g$, and the continuance of the spring-pressure causes the coupling member $e$, slightly turned to one side, to lie against the coupling-casing in the position shown in dotted lines. When releasing the coupling, the coupling members are thus moved forward and swung sidewise. In doing so the rod $k$ must be withdrawn until the lever $m$ engages in the recess I, which separates the rod $k$ from the arm $h$. This further movement of the rod $k$ is necessary, because in reëngaging the spring $l$ has to withdraw the coupling members before the said bearings are turned into their coupling positions. The recess I thus serves to tension the spring $l$ in reëngaging the coupling members. Thus if by means of one of the hand-levers $v$ the rod $k$ is moved from the dotted position forward the recess I takes the lever $m$ with it, and the spring $l$ thereby tensioned pulls the coupling member into its back position, when the pawl $t$ of the rod $k$ will meet the fork of the arm $h$ and turn the bearings $h'$ into the coupling position in which the pivots $i$ on the shank of the coupling member $e$ are cut off from the slot $g$. In the meantime the pawl $n$ of the rod $k$ will have passed the spring $o$, which prevents the rod $k$ moving back. The spring $l$ is at such a point secured to the shank of the coupling member $e$ as to turn it inward until the spring $p$ thereon bears against an abutment on the coupling-casing, in which position it is retained ready for coupling.

I claim—

1. In a coupling for railway-vehicles, a coupling-casing, a laterally-movable coupling member pivoted therein, an arm fulcrumed to the pivots of the said member for locking it in position when coupled and a spiral spring connected with the said pivoted end for coupling the member previous to being locked in position and uncoupling it after having been released by the said arm, all combined substantially as and for the purpose set forth.

2. In a coupling for railway-vehicles, a coupling-casing having in its wall bearings and laterally-inclined slots communicating therewith, a turnable bush in each of the said bearings having an opening in its periphery and a coupling member having pivots engaging in the said bushes, the said slots receiving the said pivots when the said bush-openings coincide with the respective slot ends, all combined substantially as and for the purpose set forth.

3. In a coupling for railway-vehicles, a coupling-casing having in its wall bearings and laterally-inclined slots communicating therewith, a turnable bush in each of the said bearings open at the periphery, a coupling member having pivots engaging in the said bushes, a spiral spring having one end secured to the pivoted end of the said member and means in connection with the other end of the said spring for tensioning or compressing the spring to slide the said pivot into and out of the said bushes, all combined substantially as and for the purpose set forth.

4. In a coupling for railway-vehicles, a coupling-casing having in its wall bearings and laterally-inclined slots communicating therewith, a turnable bush in the said bearings open at the periphery, a coupling member having pivots engaging in an arm secured to the said bushes, a slidable rod in the said casing having two recesses and its front end engaging the said arm, a spiral spring one end of which is secured to the pivoted end of the said member, a lever inside the said casing to one end of which is secured the other end of the said spring and the other end adapted to engage in the said recesses and means operated from the side of the vehicle for moving the said rod backward and forward, all combined substantially as and for the purpose set forth.

ERNST ULBRICH.

Witnesses:
ULYSSES J. BYWATER,
LOUIS D. MUELL.